Jan. 18, 1938.                C. DAUM                2,105,638
LUNCH KIT
Filed June 27, 1935

INVENTOR.
Charles Daum
BY
ATTORNEY.

Patented Jan. 18, 1938

2,105,638

UNITED STATES PATENT OFFICE 2,105,638

LUNCH KIT

Charles Daum, Forest Hills, Long Island, N. Y.

Application June 27, 1935, Serial No. 28,634

2 Claims. (Cl. 206—4)

This invention relates to improvements in lunch kits, being particularly directed to the construction thereof for properly supporting a thermos bottle in the cover.

The object of this invention is to provide a novel support for a bottle or other cylindrical object normally disposed in a cover, such support extending under and across the thermos bottle or cylindrical object when the same is carried, the support member being displaceable about the horizontal axis to permit insertion and removal of the thermos bottle or cylindrical object, and having its free end associated with a resilient latching means on the wall of the cover, the support member being displaceable upon actuation by the resilient latch to permit insertion and removal of the thermos bottle or cylindrical object.

Specifically, it is an object of this invention to provide a novel structural assembly of a support member for thermos bottle or the like, disposed in covers of lunch kits, wherein the support member is mounted at one end for angular displacement about the horizontal axis, and its free end disposable in a resilient latching element to firmly position the thermos bottle within the cover, the latching element comprising a bowed ear slotted to receive the free end of the support member, which end of the support member is releasable for movement upon displacement of the latch element.

These and other advantages, capabilities and features of the invention will appear from the subjoined detailed description of one specific embodiment thereof illustrated in the accompanying drawing, in which Fig. 1 is a perspective view partly broken away of a lunch kit embodying the invention.

Figure 2:
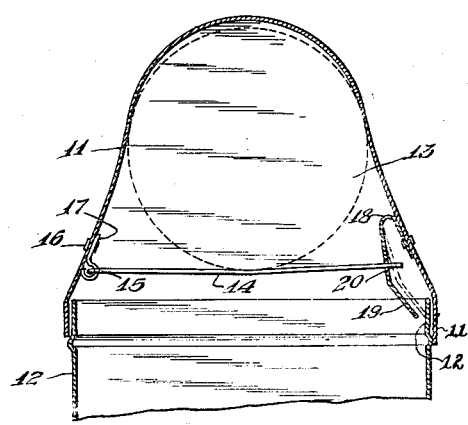
Fig. 2 is a side elevation of the lunch kit incorporating this invention with a thermos bottle in section supported thereon.

Referring to the reference characters in the drawing, numeral 10 represents a lunch kit having a body portion 12, and a cover 11 campanulate in cross-section, in which cover there is adapted to be disposed a cylindrical object 13, such as a thermos bottle, as shown in Fig. 2 of the drawing.

Since the essence of this invention is in the support member 14 for maintaining the thermos bottle or cylindrical object in position, no description will be given of the constructional details of the body and cover portions of the device, the same being well known.

The support member 14 comprises a flat strip of metal having a slot 15 at one end, whereby said support member may be mounted in the eye 16 of the lug 17 fastened to one of the side walls of the cover.

Figure 1:
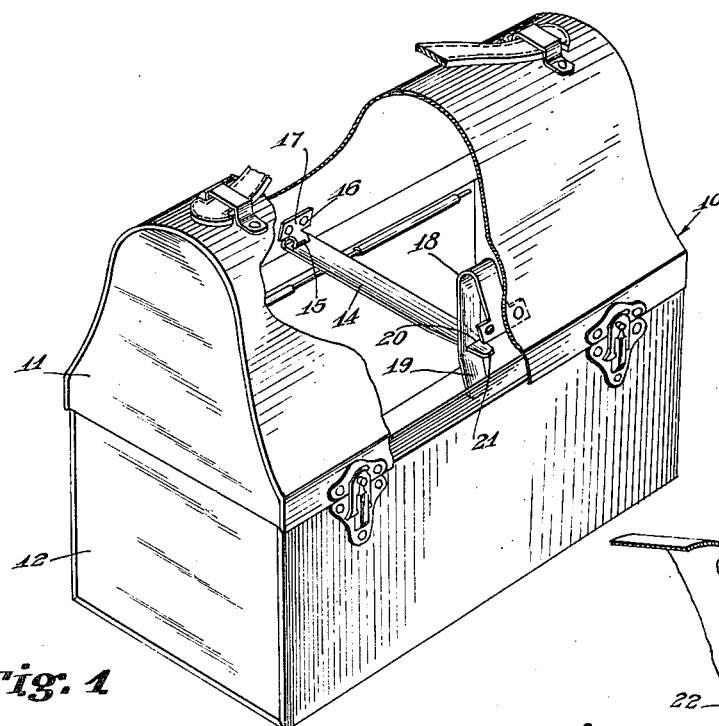
Figure 3:
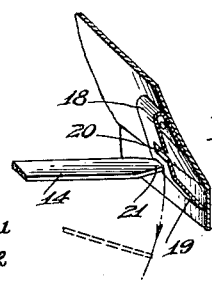
Fig. 3 is a detailed perspective side elevation in section of the latching mechanism.

To the other side wall of the cover, in the form shown in Figs. 1 to 3, there is fastened a lug or ear 18 comprising a bowed substantially U-shaped resilient strip of metal, the longer arm 19 of which is slotted as at 20, the slot extending horizontally and being of size to permit insertion therein of the reduced end 21 of the support member 14 when the arm 19 of the ear 18 is in its normal position, as shown in Fig. 1 and in full lines in Fig. 2; the support member being disposed in horizontal relationship directly below the thermos bottle to firmly support the same.

As shown in the dotted lines in Fig. 2 and the full lines in Fig. 3, in order to unlatch the support member for angular displacement thereof about the horizontal axis, as shown in dotted lines in Fig. 3, the long arm 19 of the ear 18 is pressed towards the wall of the cover, as shown in dotted lines in Fig. 2, whereupon the end 21 of the support member passes out of the aperture 20 of the long arm 19 and moves in the direction of the arrow to the dotted line position shown in Fig. 3, thus permitting removal of the thermos bottle or like object from the cover.

To lock the thermos bottle in the cover all that is necessary is to move the support member from the dotted line position thereof, shown in Fig. 3, while the long arm 19 of the ear 18 is pressed against the wall of the cover until the end 21 of the support member 14 is opposite the aperture 20 of the ear, at which point by releasing the pressure on the long arm 19 the free end 21 of the support member passes into the aperture 20 to form the latch shown in full lines in Figs. 1 and 2. Although the ear formation 18 providing the latch has been indicated to be operable for locking the support member in horizontal position by pressing the long arm 19 of the latch towards the wall of the cover until the free end of the support member is opposite the aperture 20 of the latch member, it is possible, in accordance with this invention, in view of the resiliency of the ear 18 and, particularly the long arm 19 thereof, merely to displace the support member shown in dotted lines in Fig. 3, in reverse direction of the arrow shown in such figure, causing the free end thereof by contacting the surface of the long arm to press the long arm against the side wall until the free end of the support member is opposite the slot 20 of the long arm, at which point the free end of the support member passes into the slot, while the long arm, being resilient, and the pressure thereon being released, moves to the full line position shown in Figs. 1 and 2 to lock the support member in proper position.

Figure 4:
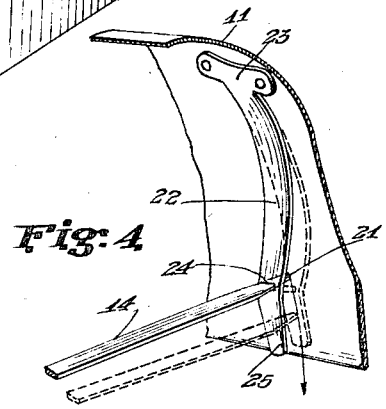
Fig. 4 is a perspective view, partly broken away, embodying a modified form of latch.

In the modification shown in Fig. 4, the latch element is in the form of a resilient concavely bowed strip 22 fastened at one end 23 as by riveting and having a slot 24 for receiving the reduced end 21 of the support member 14. The free end 25 of said strip 22 is flat, so as to permit ready displacement of the reduced end 21 of the support member into and out of the slot 24, as shown in the full and dotted lines position respectively of the bowed strip and support in Fig. 4.

As shown in Figures 1 and 2, the front wall 12' of the base 12 is in the nature of the construction disposed inwardly of the wall 11' of the cover 11; so that it serves as a stop for the free end 19 of the ear 18, in the event that the same should be displaced accidentally to the dotted line position shown in Figure 2 when the lunch kit is closed; by virtue of the function of wall 12' as the stop for the free end of the ear 18 the free end 20 of the support 14 cannot, when the lunch kit is closed, be displaced from the aperture 21 in which it is locked. Similarly, in the construction shown in Figure 4, the free end 25 of the ear 23 will be caused to abut stop 12' in the event of accidental displacement, thereby preventing release of free end 21 of the support 14 from slot 24 of the ear.

It is obvious that various changes and modifications may be made to the details of construction without departing from the general spirit of the invention as set forth in the appended claims.

I claim:

1. A lunch box comprising a body and a cover hinged to the same, a plurality of ears formed at the lower portion of the respective sides of said cover; a support extending across the space between the sides of the cover and pivotally mounted on one of said ears for displacement about a horizontal axis, and said other ear being resilient and mounted at one of its ends to the side wall, said ear having an aperture intermediate of its ends, into which the free end of said support may pass, such free end of said support, upon movement, being adapted to contact with and displace said last named ear sufficiently to permit said free end of said support to enter into said aperture, thereby to interlock with the support and ear.

2. A lunch box comprising a body and a cover hinged to the same, a plurality of ears formed at the lower portion of the respective sides of said cover; a support extending across the space between the sides of the cover and pivotally mounted on one of said ears for displacement about a horizontal axis, and said other ear being resilient and mounted at one of its ends to the side wall, said ear having an aperture intermediate of its ends, into which the free end of said support may pass, such free end of said support, upon movement, being adapted to contact with and displace said last named ear sufficiently to permit said free end of said support to enter into said aperture, thereby to interlock with the support and ear, the wall of the body adjacent the wall of the cover carrying said resilient ear serving as a stop for the free end of said ear to prevent displacement thereof sufficiently to permit accidental release of the free end of said support member from the aperture in the ear when the lunch kit is closed.

CHARLES DAUM.